(12) United States Patent
Vanderwende et al.

(10) Patent No.: US 9,075,873 B2
(45) Date of Patent: Jul. 7, 2015

(54) GENERATION OF CONTEXT-INFORMATIVE CO-CITATION GRAPHS

(75) Inventors: Lucretia Henrica Vanderwende, Sammamish, WA (US); Oscar Gerardo Naim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 13/045,544

(22) Filed: Mar. 11, 2011

(65) Prior Publication Data

US 2012/0233152 A1    Sep. 13, 2012

(51) Int. Cl.
*G06F 17/30* (2006.01)

(52) U.S. Cl.
CPC .... *G06F 17/30728* (2013.01); *G06F 17/30011* (2013.01)

(58) Field of Classification Search
CPC ............... Y10S 707/99935; Y10S 707/99943; Y10S 707/99933; G06F 17/30882; G06F 17/30705; G06F 17/30728; G06F 17/3071; G06F 17/30713; G06F 17/30958; G06F 17/30994; G06F 17/30011; G06F 17/30716; G06F 17/30985; G06F 3/0482; G06F 17/30277; G06F 17/30991; G06F 17/241
USPC ......................................... 707/722, 769, 739
See application file for complete search history.

(56) References Cited

U.S. PATENT DOCUMENTS

| | | | | |
|---|---|---|---|---|
| 5,832,494 | A * | 11/1998 | Egger et al. | 707/999.005 |
| 6,289,342 | B1 * | 9/2001 | Lawrence et al. | 1/1 |
| 7,555,713 | B2 | 6/2009 | Yang | |
| 7,778,982 | B2 | 8/2010 | Baker | |
| 8,232,995 | B2 * | 7/2012 | Lamping et al. | 345/440 |
| 2004/0122846 | A1 | 6/2004 | Chess et al. | |
| 2004/0243614 | A1 | 12/2004 | Boone et al. | |
| 2006/0106847 | A1 * | 5/2006 | Eckardt et al. | 707/101 |
| 2006/0112084 | A1 * | 5/2006 | McBeath et al. | 707/3 |
| 2007/0150800 | A1 | 6/2007 | Betz et al. | |
| 2007/0179776 | A1 | 8/2007 | Segond et al. | |
| 2007/0239704 | A1 * | 10/2007 | Burns et al. | 707/5 |
| 2008/0282187 | A1 * | 11/2008 | Buschman et al. | 715/784 |
| 2009/0112859 | A1 * | 4/2009 | Dehlinger | 707/6 |

(Continued)

OTHER PUBLICATIONS

Joosse, W., "User Trainable Fact", Retrieved at << http://hmi.ewi.utwente.nl/verslagen/afstudeer/JoosseWouterFinalThesis.pdf >>, Jun. 2007, pp. 1-86.

*Primary Examiner* — Jean B Fleurantin
*Assistant Examiner* — Evan Aspinwall
(74) *Attorney, Agent, or Firm* — Sandy Swain; Judy Yee; Micky Minhas (57) ABSTRACT

Described herein are technologies pertaining to generating co-citation graphs. A context-informative co-citation graph includes a first node that represents a first research document, a second node that represents a second research document, and a third node that represents a third research document that includes a citation to both the first research document and the second research document. The context-informative co-citation graph also includes a first edge that couples the first node and the third node, and a second edge that couples the second node and the third node. The two edges visually indicate that the first research document and the second research document are co-cited by the third research document. The context-informative co-citation graph further includes at least a portion of a sentence in the third research document that includes a citation to at least one of the first research document or the second research document.

20 Claims, 8 Drawing Sheets

(56) References Cited

U.S. PATENT DOCUMENTS

| | | |
|---|---|---|
| 2010/0031141 A1 | 2/2010 | Summers et al. |
| 2010/0169299 A1 | 7/2010 | Pollara |
| 2010/0228693 A1* | 9/2010 | Dawson et al. ............. 706/12 |
| 2011/0066616 A1* | 3/2011 | Rhoads et al. ............. 707/769 |
| 2011/0219017 A1* | 9/2011 | Cui ............................. 707/769 |
| 2011/0295903 A1* | 12/2011 | Chen .......................... 707/794 |

* cited by examiner

GENERATION OF CONTEXT-INFORMATIVE CO-CITATION GRAPHS

BACKGROUND

Research can be defined as a quest for knowledge, or as some systematic investigation to establish novel facts or concepts, oftentimes through utilization of a scientific method. Generally, research is undertaken in connection with discovering, interpreting, and developing methods and systems pertaining to the advancement of human knowledge on a wide variety of subject matters. Typically, advancements made in a particular field are based at least in part upon previous advances made in the same field or a related field. Accordingly, a researcher in connection with discovering, interpreting and/or developing a new method or system oftentimes turns to existing research papers written by other authors.

From the above, it can be ascertained that a scientific researcher spends a significant amount of time reviewing and processing research documents written by others when developing an advancement in a particular field. If the researcher locates a research document that is germane to an area of interest of the researcher, the researcher will review such document and may also desirably locate other research documents that are in some way related to that research document. An existing mechanism for locating related research documents is to analyze the bibliography of a currently reviewed research document and read references cited by that research document. This approach, however, has the deficiency that the researcher is reading documents that were written prior to the research document that the researcher found to be of interest. Thus, through this approach, the researcher may not locate a research document that describes more recent advances in the field of interest to the researcher.

Some research document searching services provide tools that allow a researcher to search for documents that have cited to a particular document of interest. This approach allows the researcher to quickly locate more recently published research documents that cited the research document of interest. For research documents that have been cited to by numerous other research documents, however, a significant amount of time may be required for the researcher to analyze all research documents that cite to the research document of interest.

Accordingly, systems that facilitate searching for research documents have been designed to include tools that allow research documents to be located by counting co-citations with respect to pairs of research documents. In other words, a first research document can be inferred to be highly related to a second research document if the first and second research document are often co-cited (both cited in other research documents). Using a system that supports locating research documents through counting co-citations, the researcher can identify a first research document that is of interest to the researcher to the system. Thereafter, the user can indicate that she wishes to be provided with co-citation information. A conventional research document search and analysis system can provide the user, responsive to receiving such request, a list of other research documents that are commonly co-cited with the previously identified research document. Accordingly, the researcher can infer that research documents in the list of co-cited research documents are in some way related to the identified research document. Oftentimes, however, a research document will include numerous advances in a particular field and may be cited to by other research documents for entirely different reasons. Therefore, the reviewer of this co-citation information has no context as to why the research documents were co-cited with the research document of interest.

SUMMARY

The following is a brief summary of subject matter that is described in greater detail herein. This summary is not intended to be limiting as to the scope of the claims.

Various technologies pertaining to generating a context-informative co-citation graph that can be navigated by a researcher is illustrated. Such a context-informative co-citation graph can inform the researcher not only that two documents have been co-cited by at least one other research document, but can also provide the researcher with information as to why these two research documents have been co-cited. Such a context-informative co-citation graph can save a researcher a significant amount of time when performing research in a particular area of interest.

To generate a context-informative co-citation graph, data that is utilized in connection with generating such graph can be obtained. For instance, a document collection can be gathered and certain data can be extracted from each document in the document collection. Pursuant to an example, a computer executable program can be configured to analyze a research document and identify a title of the research document, authors of the research document, text of the research document, and bibliography of the research document. For the text portion, such text can be broken into individual sentences. For instance, the computer executable program can be configured to search for periods, capitalization, can utilize natural language processing techniques, etc., to identify sentences in the text of the research document. For each identified sentence, a determination can be made regarding whether such sentence includes a citation to another research document. For example, a sentence that includes a citation to another research document may include a linked citation, a footnote, a short citation, etc. If the sentence is found to include a citation to another research document, the short citation corresponding to the sentence can be mapped to the more formal citation in the bibliography of the research document. Thereafter, the identity of the research document (title, author, other identifying information), the identity of the work that is cited to by the research document (the cited research document), and the sentence that includes the citation to the cited research document can be extracted. Again, this can be undertaken for each research document in the document collection such that a plurality of data packets are generated, wherein each data packet includes an identity of a citing research document, an identity of a cited research document, and a sentence that includes a citation to the cited research document.

Once the aforementioned collection of data packets has been generated, such data packets can be utilized in connection with generating a context-informative co-citation graph. Pursuant to an example, a user can provide input such as a query to a search system for a particular research document. For example, the query can include the title of the research document, an author of the research document, or some other information that is indicative of the identity of the research document of interest to the user. Responsive to receipt of such query, a search can be executed over the data packets in the aforementioned data packet collection to locate the research document, as well as research documents or co-citation information pertaining to the research document.

In other words, based at least in part upon the user input, documents that are currently co-cited with the research document of interest can be located. These co-cited research documents can be presented to the user in a graphical form, such that the user can navigate the graph and also ascertain contextual information that indicates why two research documents are co-cited. In an example, a context-informative co-citation graph can include a first node that is representative of the research document of interest to the user. The co-citation graph can also include a second node that is representative of a second research document that is co-cited with the first research document by at least one other research document (a third research document). In an example, an edge can connect the first node with the second node, wherein length, weight, or color of the edge can be indicative of a number of times that the first research document and the second research document were co-cited by other research documents.

The co-citation graph can also include a third node that is representative of a third research document that includes citations to both the first research document and the second research document. The co-citation graph can further include a second edge that couples the first node to the third node, and a third edge that couples the second node to the third node, to visually indicate to the researcher that the third research document includes citations to both the first research document and the second research document. Moreover, sentences from the third research document that include the citations to the first research document and the second research document can be included in the co-citation graph, thereby providing the researcher with context as to why the third research document co-cited the first and second research documents. In an example, these sentences can be shown as nodes in the co-citation graph. Additionally or alternatively, the sentences can be graphically depicted to the researcher subsequent to the researcher hovering over one of the edges in the co-citation graph and/or over the third node in the co-citation graph.

The co-citation graph can also be navigated through by the user, for instance, by user-selection of particular nodes in the co-citation graph. Continuing with the example provided above, the user can select the third node, and responsive to such selection one or more other nodes can be displayed on the co-citation graph that visually indicate to the researcher which research documents are often co-cited with the third research document. Still further, the co-citation graph can be configured to provide author information to the user. In an example, the user can hover over one of the nodes in the co-citation graph that is representative of a research document. Responsive to the hovering over the one or more nodes, information pertaining to authors of the research document can be visually presented to the user in an in-line pop-up, for example. For instance, this author information can include a list of other publications authored by such author, a link to a web page of the author, and an image or biographical information of the author, etc.

Other aspects will be appreciated upon reading and understanding the attached figures and description.

DETAILED DESCRIPTION

Various technologies pertaining to context-informative co-citation graphs will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
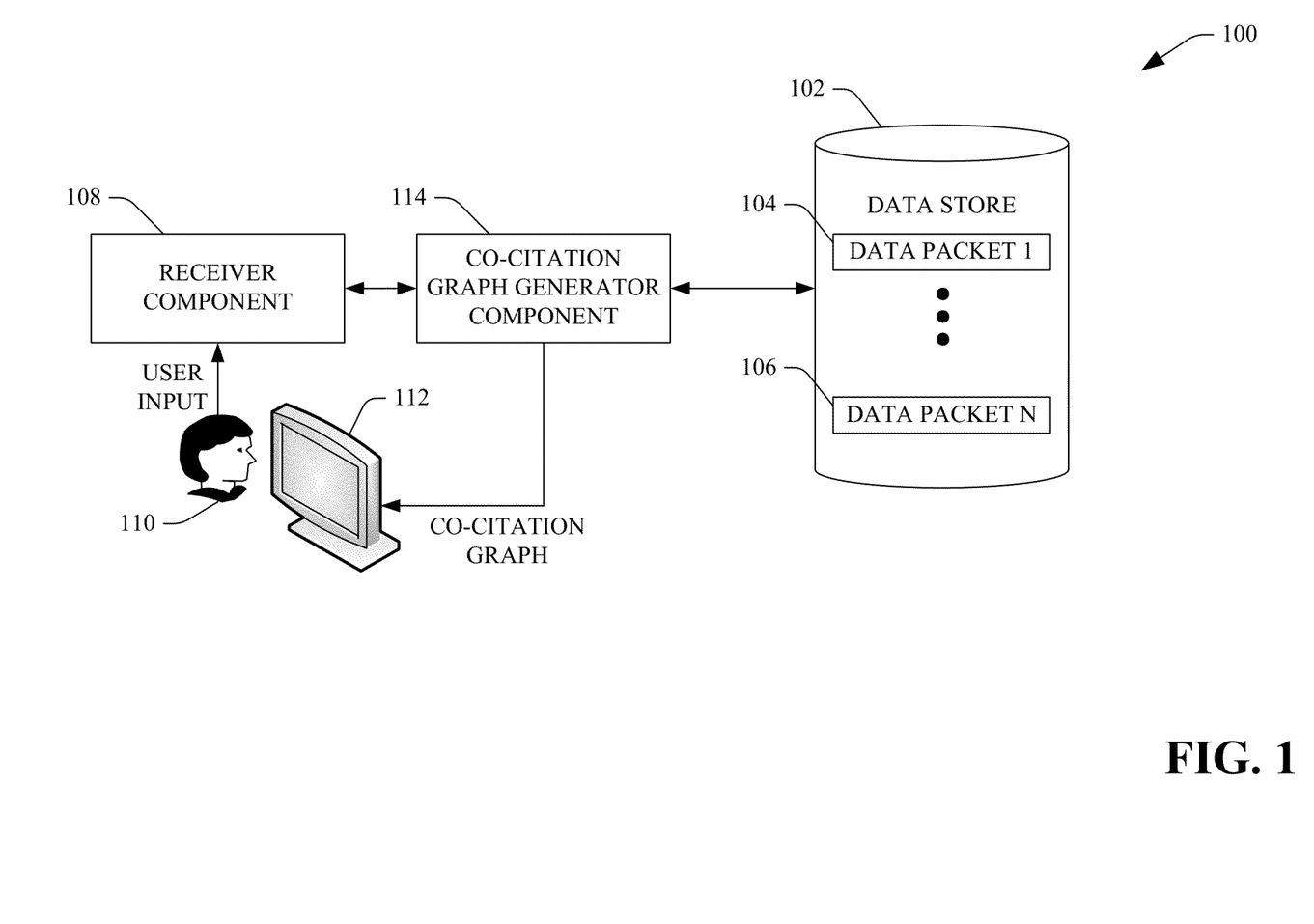
FIG. 1 is a functional block diagram of an exemplary system that facilitates generating a context-informative co-citation graph.

With reference to FIG. 1, an exemplary system 100 that facilitates generating a context-informative co-citation graph for presentation to a user on a display screen of a computing device is illustrated. The system 100 includes a data store 102 that comprises a plurality of data packets 104-106 that pertain to research documents. A "research document" as used herein is a document that includes at least one citation to another research document. As will be described below, the data packets 104-106 can be automatically generated through execution of a computer program over a collection of research documents. Pursuant to an example, each of the data packets 104-106 can include the following information: first data that is indicative of a research document that includes a citation, second data that is indicative of the research document that is cited to, and third data that includes at least a portion of a sentence in the citing research document that includes the citation to the cited research document. In other words, each data packet includes a cited work and at least a portion of a sentence that includes a citation in the citing work to the cited work. Each of the data packets 104-106 may also include other information that pertains to research documents, including identities of authors of research documents, annotations that have been assigned to the research documents, publication dates of the research documents, etc.

The system 100 further comprises a receiver component 108 that receives input from a user 110 of a computing device 112. For example, the user input provided to the receiver component 108 by the user 110 may be a textual query pertaining to a particular research document of interest to the user 110. In another example, the user input from the user 110 may be a gesture or a spoken command (e.g., if the computing device 112 is configured to receive and interpret gestures and/or spoken commands). Still further, the user input may be a selection of a particular portion of a context-informative co-citation graph, which will be described in greater detail herein.

The system 100 further comprises a co-citation graph generator component 114 that is in communication with the receiver component 108 and accesses the data store 102 responsive to the receiver component 108 receiving the user input. The co-citation graph generator component 114 can execute a search over the contents of the data store 102 (over the plurality of data packets 104-106) to locate information pertaining to the research document of interest that was located based at least in part upon the user input (the first research document). Pursuant to an example, the co-citation graph generator component 114 can search the data packets 104-106 to locate research documents that include citations to the first research document (located research documents). Once the located research documents are identified, the co-citation graph generator component 114 can further search over the data packets 104-106 to locate other research documents that are cited by the located research documents. Therefore, the co-citation graph generator component 114 can analyze contents of the data packets 104-106 to identify research documents that are co-cited with the first research document.

Pursuant to an example, the co-citation graph generator component 114 can select a top threshold number of research documents that are co-cited with the first research document. In another example, the co-citation graph generator component 114 can select research documents that are co-cited a threshold number of times with the first research document. In still yet another example, the co-citation graph generator component 114 can select each research document that is co-cited with the first research document.

Based at least in part upon the aforementioned searches and selections made by the co-citation graph generator component 114, the co-citation graph generator component 114 can generate a co-citation graph that is context-informative, and can cause such co-citation graph to be displayed on a display screen of the computing device 112 to the user 110. For instance, the computing device 112 can be a desktop computing device, a laptop computing device, a mobile computing device such as a portable telephone, or other suitable computing device.

As will be shown below, the co-citation graph generated by the co-citation graph generator component 114 can include a node that is representative of the first research document, at least one other node is representative of a second research document that is co-cited with the first research document, and at least one other node that represents a third research document that includes citations to both the first research document and the second research document. Still further, the co-citation graph generator component 114 can cause at least a portion of the sentence or sentences that include the citations to both the first and second research documents to be presented on the display screen of the computing device 112 to the user 110. Accordingly, the user 110, through analysis of the co-citation graph, can ascertain which documents are frequently co-cited with the first research document, as well as why such research documents are co-cited.

Figure 2:
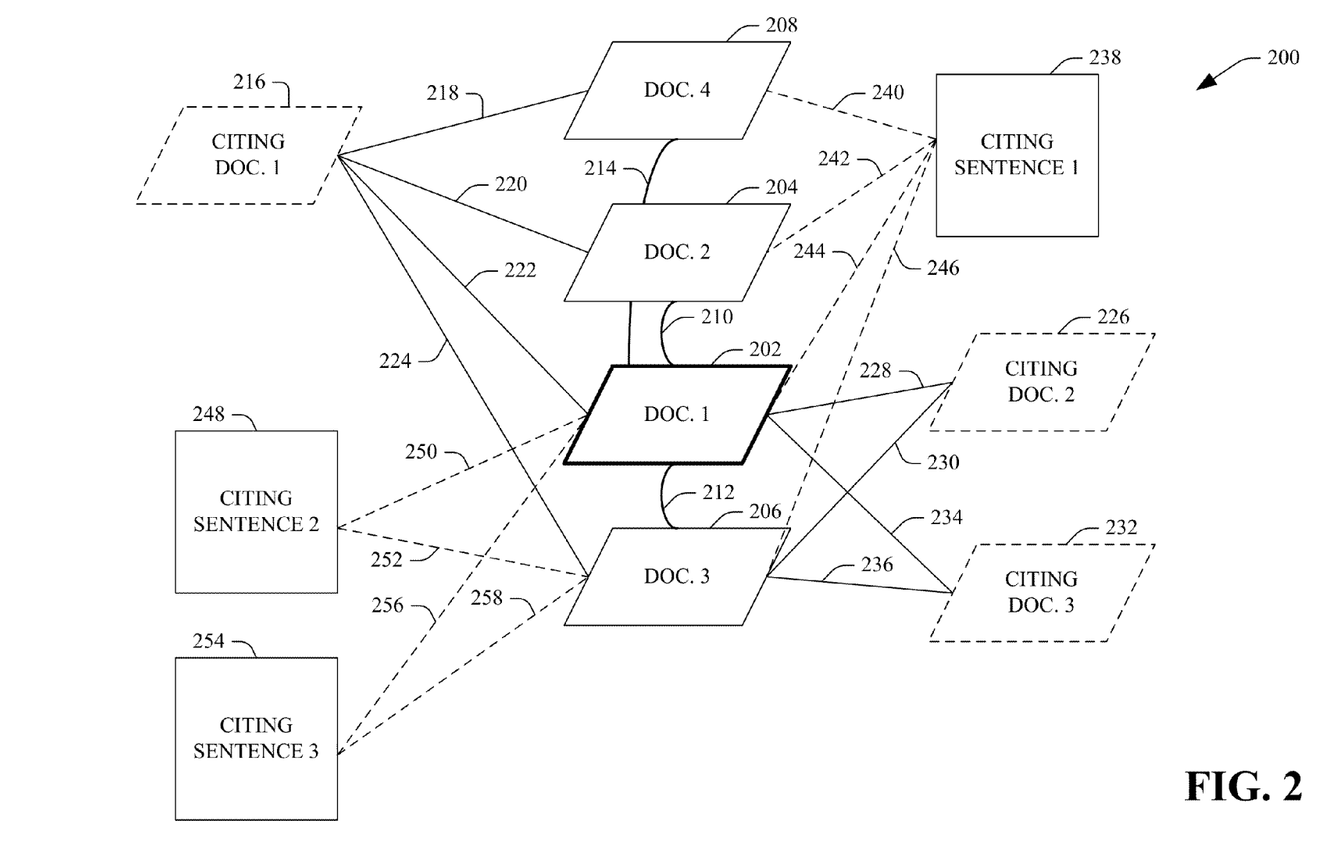
FIG. 2 is an exemplary context-informative co-citation graph.

Turning now to FIG. 2, an exemplary context-informative co-citation graph 200 that can be generated by the co-citation graph generator component 114 is illustrated. The exemplary co-citation graph 200 comprises a first node 202 that is representative of a first research document that is of interest to the user 110. The co-citation graph 200 further comprises a second node 204 that is representative of a second research document that is co-cited with the first research document, a third node 206 that is representative of a third research document that is co-cited with the first research document, and a fourth node 208 that is representative of a fourth research document that is co-cited with the first research document. Pursuant to an example, the first node 202 can be shown in a manner to visually distinguish the first node 202 from the second node 204, the third node 206, and the fourth node 208. For example, the first node 202 may be shown in a first line weight that is different from line weights utilized when drawing the second, third and fourth nodes 204-208, respectively. In another example, the first node 202 can be shown in a different color than the second, third, and fourth nodes 204-208, respectively. In a further example, each node can be shown in a different color, wherein the first node 202 can be shown in a first color, the second node 204 can be shown in a second color, the third node 206 can be shown in a third color, wherein the first color, second color, and third color are respectively different. Provision of the first node 202 in a visually distinguishable manner can inform the user 110 that the first research document that is represented by the first node 202 is the subject of the co-citation graph 200.

The co-citation graph 200 can optionally include a first edge 210 that couples the first node 202 and the second node 204, a second edge 212 that couples the first node 202 with the third node 206, and a third edge 214 that couples the first node 202 and the fourth node 208. In an example, length of the edges 210-214 can be indicative of a number of co-citations between the first research document and the research document represented by the nodes that are connected to the first node 202 by such edges. Therefore, for instance, in the exemplary co-citation graph 200, there are a greater number of co-citations of the first research document and the second research document than there are of co-citations of the first research document and the fourth research document. In another example, color of the edges 210-214 can be indicative of a number of occurrences of co-citations between research documents represented by nodes that are coupled by such edges 210-214. In still yet another example, line weight of the edges to 210-214 can be indicative of a number of occurrences of co-citation between research documents represented by the nodes 202-208 that are coupled by the edges 210-214.

The exemplary co-citation graph further comprises a fifth node 216 that is representative of a first citing research document, wherein the first citing research document cites the first research document and at least one of the other documents represented by the nodes 204-208 in the co-citation graph. The co-citation graph further comprises a fourth edge 218, a fifth edge 220, a sixth edge 222, and a seventh edge 224. The fourth edge 218 couples the fifth node 216 with the fourth node 208, thereby indicating that the first citing document includes a citation to the fourth research document. The fifth edge 220 couples the fifth node 216 and the second node 204, thereby visually indicating to the user 110 that the first citing document includes a citation to the second research document. The sixth edge 222 couples the fifth node 216 and the first node 202, thereby visually indicating to the user 110 that the first citing document includes a citation to the first research document. The seventh node 224 couples the fifth node 216 and the third node 206, thereby visually indicating to the user 110 that the first citing document includes a citation to the third research document. Accordingly, through analysis of the co-citation graph 200, the user 110 can visually surmise that the first citing document represented by the fifth node 216 co-cites the first research document, the second research document, the third research document, and the fourth research document (represented by the nodes 202-208).

The co-citation graph 200 further comprises a sixth node 226 that is representative of a second citing document, an eighth edge 228 couples the sixth node 226 with the first node 202, and a ninth edge 230 couples the sixth node 226 with the third node 206. The eighth edge 228 and the ninth edge 230 visually indicate that the second citing document co-cites the first research document and the third research document. The co-citation graph 200 further comprises a seventh node 232 that is representative of a third citing document. A tenth edge 234 couples the seventh node 232 with the first node 202, and an eleventh edge 236 couples the seventh node 232 with the third node 206. The edges 234 and 236 that couple the seventh node 232 and the first and second nodes 202 and 206, respectively, visually indicate to the user 110 that the third citing document cites both the first research document and the third research document. Pursuant to an example, the fifth node 216, the sixth node 226, and the seventh node 232 can be displayed in the co-citation graph 200 in a manner that visually distinguishes such nodes from the nodes 202-208. That is, nodes representing citing documents can be displayed differently than nodes representing cited documents. For example, citing documents can be represented by nodes displayed in a first color, while cited documents can be represented by nodes that are displayed in a second color. Alternatively, nodes representing citing documents can be displayed in a first shape, while nodes representing cited documents can be displayed in a second shape.

The co-citation graph 200 can further comprise an eighth node 238 that is representative of a first citing sentence, wherein the first citing sentence is included in the first citing document represented by the fifth node 216. Edges 240, 242, 244 and 246 connect the eighth node 238 with the fourth node 208, the second node 204 the first node 202, and the third node 206, respectively. These edges 240-246 indicate that the first citing sentence in the first citing document includes a citation to the first research document, the second research document, the third research document, and the fourth research document. If, for example, different sentences in the first citing document included citations to different ones of the first, second, third or fourth research documents, then the co-citation graph 200 can be configured to include nodes that represent the different citing sentences.

The co-citation graph 200 can further comprise a ninth node 248 that is representative of a second citing sentence from the second citing document represented by the sixth node 226. Edges 250 and 252 connect the ninth node 248 with the first node 202 and the third node 206, respectively, thereby indicating that the second citing sentence includes citations to both the first research document and the third research document. Again, if two different sentences in the second citing document cited to the first research paper and the third research paper, respectively, then different nodes that are representative of those different citing sentences can be included in the co-citation graph. In this exemplary co-citation graph 200, however, the second citing sentence cites both the first research document 202 and the third research document 206. The co-citation graph 200 further comprises a tenth node 254 that comprises a third citing sentence from the third citing document that is represented by the seventh node 232. Edges 256 and 258 couple the tenth node 254 with the first node 202 and the third node 206, respectively, thereby visually indicating to the user 110 that the third citing sentence includes citations to both the first research document and the third research document. The nodes 238, 248, and 254 that are representative of citing sentences can be shown in a manner that visually distinguishes such nodes from other nodes in the co-citation graph 200. Furthermore, the nodes 238, 248 and 254 can include at least a portion of the citing sentence such that the user 110 can ascertain reasons that research documents were co-cited.

Additionally, the eighth node 238 and the fifth node 216 can be displayed such that the user 110 can visually ascertain that the first citing sentence is included in the first citing document. For example, the eighth node 238 and the fifth node 216 can be shown in a same color. Similarly, the sixth node 226 and the ninth node 248 can be displayed to correlate to one another such that the user 110 can ascertain that the second citing sentence is included in the second citing document. Still further, the edges 240-246, 250 and 252 and 256 and 258 can be shown in the co-citation graph 200 in a manner to visually indicate to the user 110 that such edges correspond to citing sentences. For instance, these edges can be shown in dashed form, as is illustrated in FIG. 2.

Figure 3:
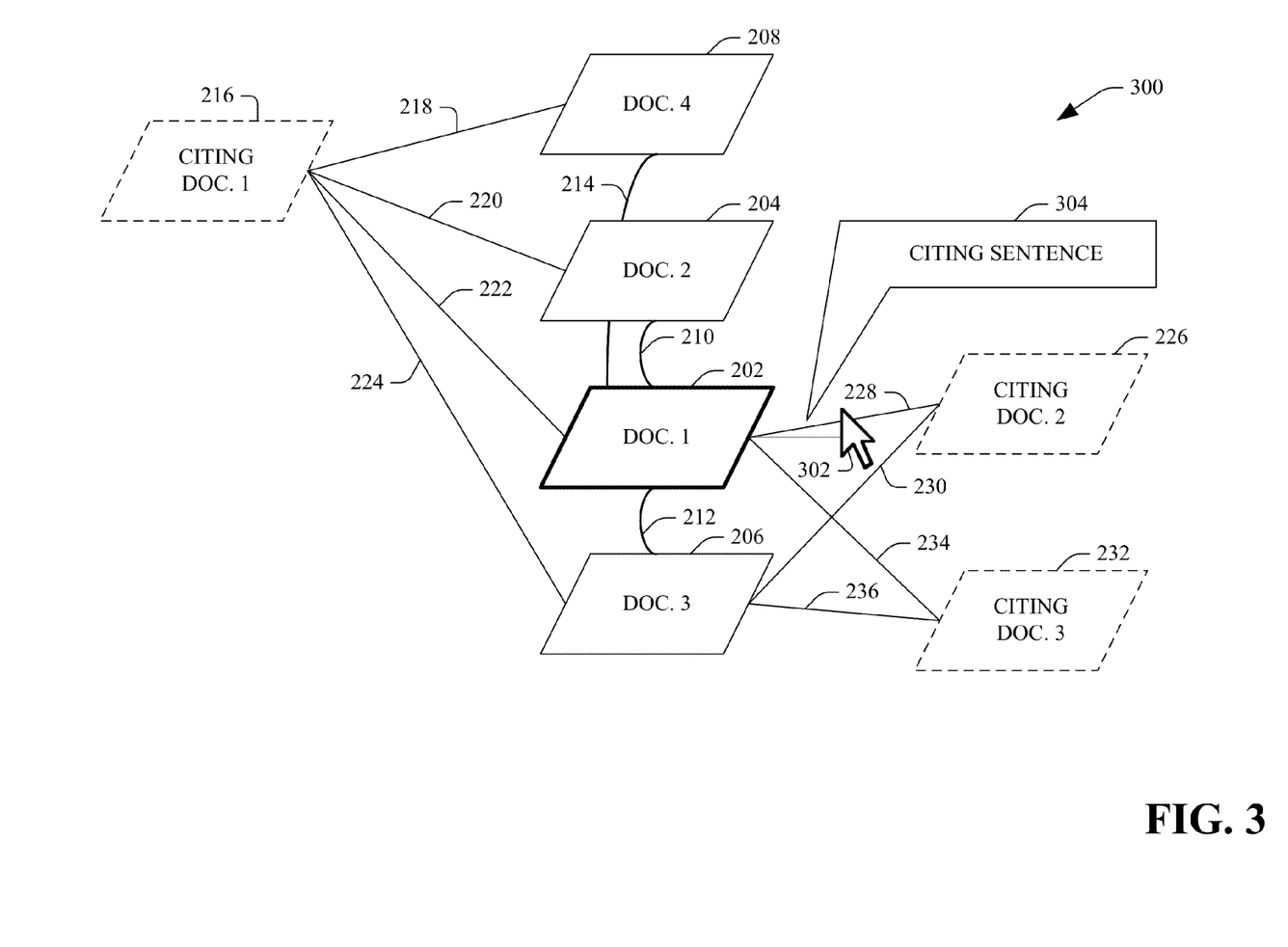
FIG. 3 illustrates another exemplary context-informative co-citation graph.

With reference now to FIG. 3, another exemplary co-citation graph 300 is illustrated. The co-citation graph 300 comprises the nodes 202, 204, 206, 208, 216, 226 and 232. As described above, these nodes represent the first research document, the second research document, the third research document, the fourth research document, the first citing document, the second citing document, and the third citing document, respectively. The exemplary co-citation graph 300 further comprises the edges 210-214, 218-224, 228, 230, 234 and 236. In some cases, displaying a citing sentence from one of the citing documents in the form of a node in a co-citation graph may cause such graph to appear cluttered. Therefore, in some situations, there may be an insufficient amount of display screen space to include nodes that are representative of citing sentences. The user 110, however, may still wish to be provided with context pertaining to co-citations amongst research documents. Thus, in an example, the user 110 can utilize a cursor 302 to hover over one of the graphical objects included in the co-citation graph. For instance, the cursor 302 can be hovered over one of the nodes 216, 226 or 232 that represent the citing documents.

Responsive to the cursor 302 being hovered over one of such nodes, citing sentences corresponding to such citing document can be presented to the user 110, such that the user 110 is provided with sentences from the citing document that cited to one or more of the first, second, third, or fourth research documents.

In another exemplary embodiment, the edge 228 between the first node 202 and the sixth node 226 can represent the citation of the second citing document to the first research document. The user 110 can hover the cursor 302 over the edge 228, and responsive to the co-citation graphic generator component 114 detecting the hover of the cursor 302 over the edge 228, an inline pop-up 304 can be presented that includes at least a portion of the citing sentence. In an example, the inline pop-up 304 can display the entirety of the citing sentence from the second citing document that includes a citation to the first research document. In another example, the in-line pop-up 304 can include, for instance, an automatically extracted subject, predicate, object triple, but may not display the entirety of the citing sentence. This may be useful if a citing sentence is relatively long and if display screen space is at a premium. The user 110 may view other citing sentences from the citing documents by hovering the cursor 302 over other edges in the co-citation graph. Therefore, the user 110 can be provided with context corresponding to co-citation of research documents.

Figure 4:
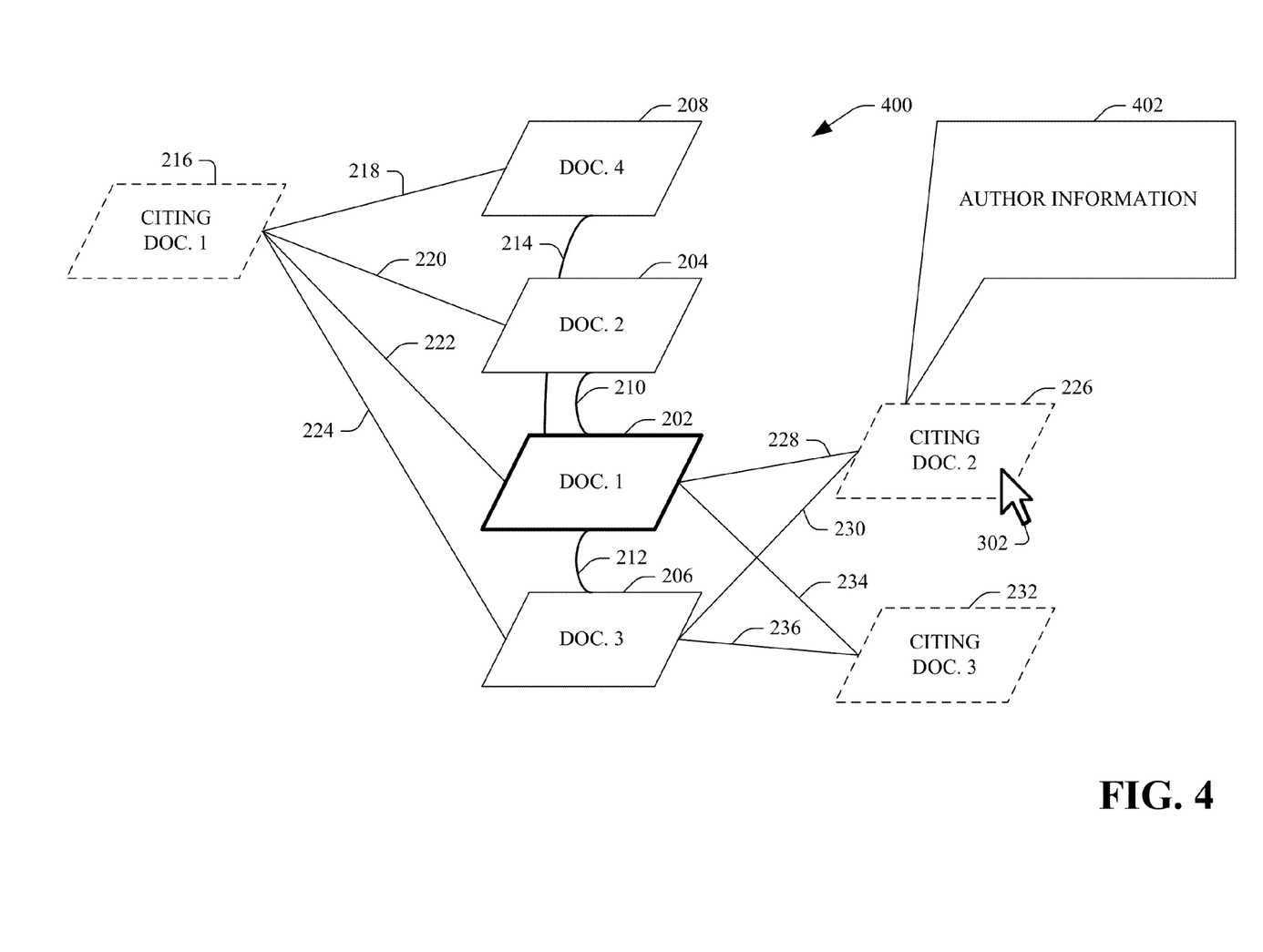
FIG. 4 illustrates yet another exemplary context-informative co-citation graph.

Referring now to FIG. 4, another exemplary co-citation graph 400 that can be generated by the co-citation graph generator component 114 is illustrated. The exemplary co-citation graph 400 comprises the first node 202, the second node 204, the third node 206, the fourth node 208, the fifth node 216, the sixth node 226, and the seventh node 232, which represent research documents that have been described above. The co-citation graph 400 also comprises the edges 210-214, 218-224, 228-234, and 236. The user 110 may wish to learn about information pertaining to authors of one of the documents represented by the aforementioned nodes. For example, the user 110 may wish to ascertain who authored the second citing document that is represented by the sixth node 226. The user 110 can cause the cursor 302 to be hovered over one of the nodes (e.g., the sixth node 226), which can cause an in-line pop-up 404 to be displayed to the user 110. The in-line pop-up 404 can include information about at least one of the authors of the research documents that is represented by the node being hovered over by the cursor 302. For example, if the second citing document was authored by a single author, the in-line pop-up 404 can include biographical information about that author. It is to be understood, however, that biographical information about more than one author can be shown in the in-line pop-up 404. In another example, a list of authors can be presented in the in-line pop-up 404, wherein each author in the list has a hyperlink corresponding thereto. The user 110 may then utilize the cursor 302 to select a hyperlink pertaining to a particular author, which can direct the user to a web page, for instance, that lists publications authored by such author as well as biographical information about the author. Still further, the in-line pop-up 404 can include an image of at least one of the authors of the second citing document.

Furthermore, while not shown, the user can select one of the nodes in the co-citation graph 400, which can cause a research document represented by the selected node to be presented to the user. For example, if the user 110 wished to view the second citing document, the user 110 can select the sixth node 226 through utilization of the cursor 302, which can cause the second citing document to be presented to the user 110. Additionally or alternatively, selection of one of the nodes that represent a research document can cause a web page corresponding to such research document to be presented to the user 110. For example, the document selected by the user 110 may be available for purchase on the web page provided to the user 110.

Figure 5:
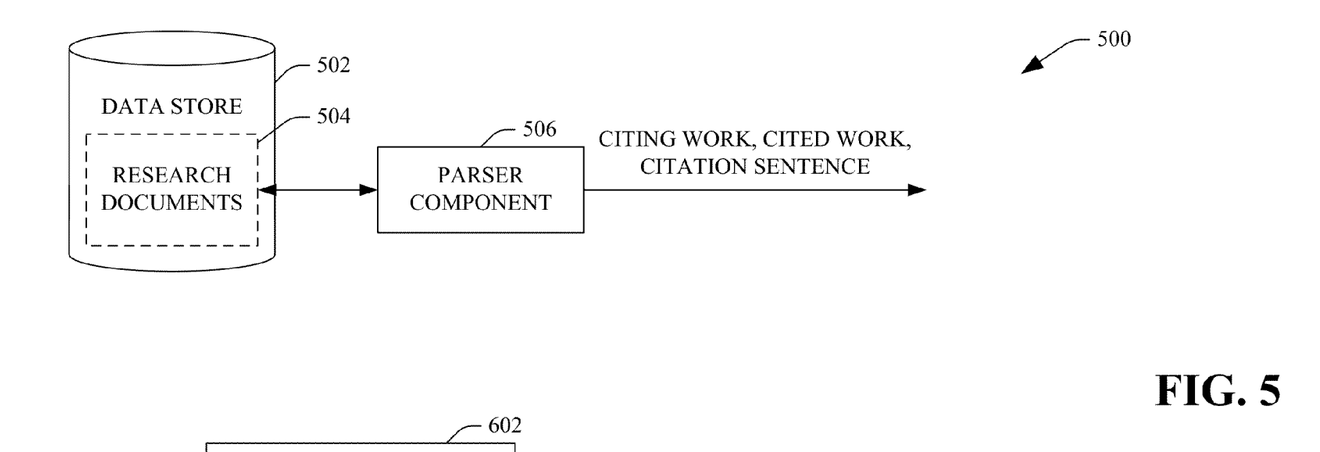
FIG. 5 is a functional block diagram of an exemplary system that facilitates extracting information from a research document that can be utilized in connection with generating a context-informative co-citation graph.

Referring now to FIG. 5, an exemplary system 500 that facilitates creation of the data packets 104-106 that are utilized by the co-citation graph generator component 114 to generate the context-informative co-citation graph is illustrated. The system 500 comprises a data store 502 that includes a plurality of computer readable research documents. Each of the research documents in the data store 502 can include a title, an author (even if identified as anonymous), text, and a bibliography. The system 500 comprises a parser component 506 that parses each of the research documents in the data store 502 to extract a cited work and citation sentence for each citation in a document.

Figure 6:
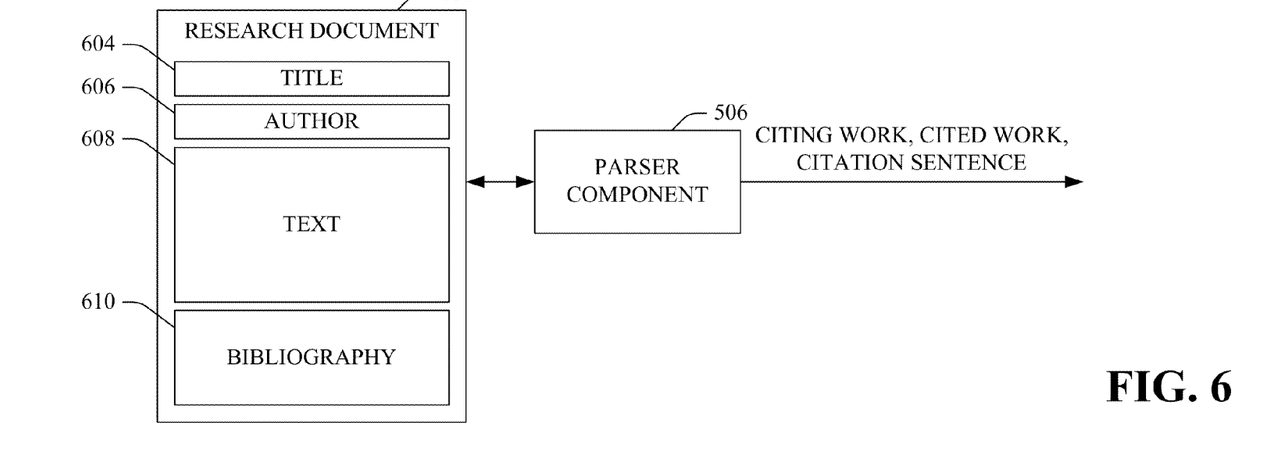
FIG. 6 is a functional block diagram of an exemplary system that facilitates extracting data indicative of a citing work, a cited work, and a citation sentence from a research document.

Turning to FIG. 6, an exemplary system 600 that facilitates generating a data packet for utilization by the co-citation graph generator component 114 in connection with generating a co-citation graph is illustrated. The system 600 includes the parser component 506. The parser component 506 is shown in connection with a particular research document 602. The research document 602 comprises a title 604, at least one author 606, a text portion 608, and a bibliography 610. The parser component 506 can access the research document 602 and can identify the title 604, the author 606, the text portion 608, and the bibliography 610. For instance, the parser component 506 can be configured to search for a larger font in a research document at the beginning of such research document 602, and can ascertain that text in such larger font at the beginning of the research document 602 is the title 604. Similarly, the parser component 506 can determine one or more authors of the research document 602 by searching for text that is immediately below the title 604, which is generally where authors of a paper are identified. In other cases, however, authors can be identified above the title 604 and the parser component 506 can also identify authorship in this manner. The parser component 506 may then identify the text portion 608, which is generally the portion of a research document that is beneath the title 604 and the author 606 but is above the bibliography 610. For example, the parser component 506 can utilize natural language processing technology in connection with differentiating the text portion 608 with the bibliography 610, the title 604, and the author 606. The bibliography 610 includes a plurality of full citations to other research documents. Again, the parser component 506 can be configured with functionality that enables such bibliography 610 to be located in the research document 602.

Once the parser component 506 has identified the text portion 608, the parser component 506 can break the text portion 608 into individual sentences. The parser component 506 can accomplish this, for instance, by searching for periods and capitalization, by utilizing natural language processing techniques to identify subject, predicate, object, triples, amongst other conventional techniques for performing sentence breaking. Once individual sentences have been identified, the parser component 506 can analyze each sentence to determine if the sentence includes a citation to another research document. For instance, a citation may be a short citation that identifies a portion of an author or title of a research document. In another example, the citation may be a numerical citation that maps to a position in the bibliography 610. Still further, in some electronic documents, the citation in the sentence can be a link to a particular entry in the bibliography 610.

If the parser component 506 determines that a sentence includes a citation to another research document, the parser component 506 can match the citation in the sentence to the full citation in the bibliography 610. Once the full citation in the bibliography 610 has been located, the parser component 506 can generate a data packet that includes the identity of the research document 602 (the citing work), an identity of the cited research document (as identified in the bibliography 610), and the sentence that includes the citation to the cited research document. In some instances it may be desirable to summarize a sentence that includes a citation; for instance, if the sentence is relatively long. The parser component 506 can further be configured with functionality that facilitates identifying the subject, object and predicate of the sentence, which can be utilized to summarize the sentence. A data packet generated by the parser component 506 may thus include an identity of the research document 602, an identity of the cited work, and the summary of the citation sentence. The parser component 506, for instance, can generate the data packet for each sentence in the text portion 608 that includes a citation.

Figure 7:
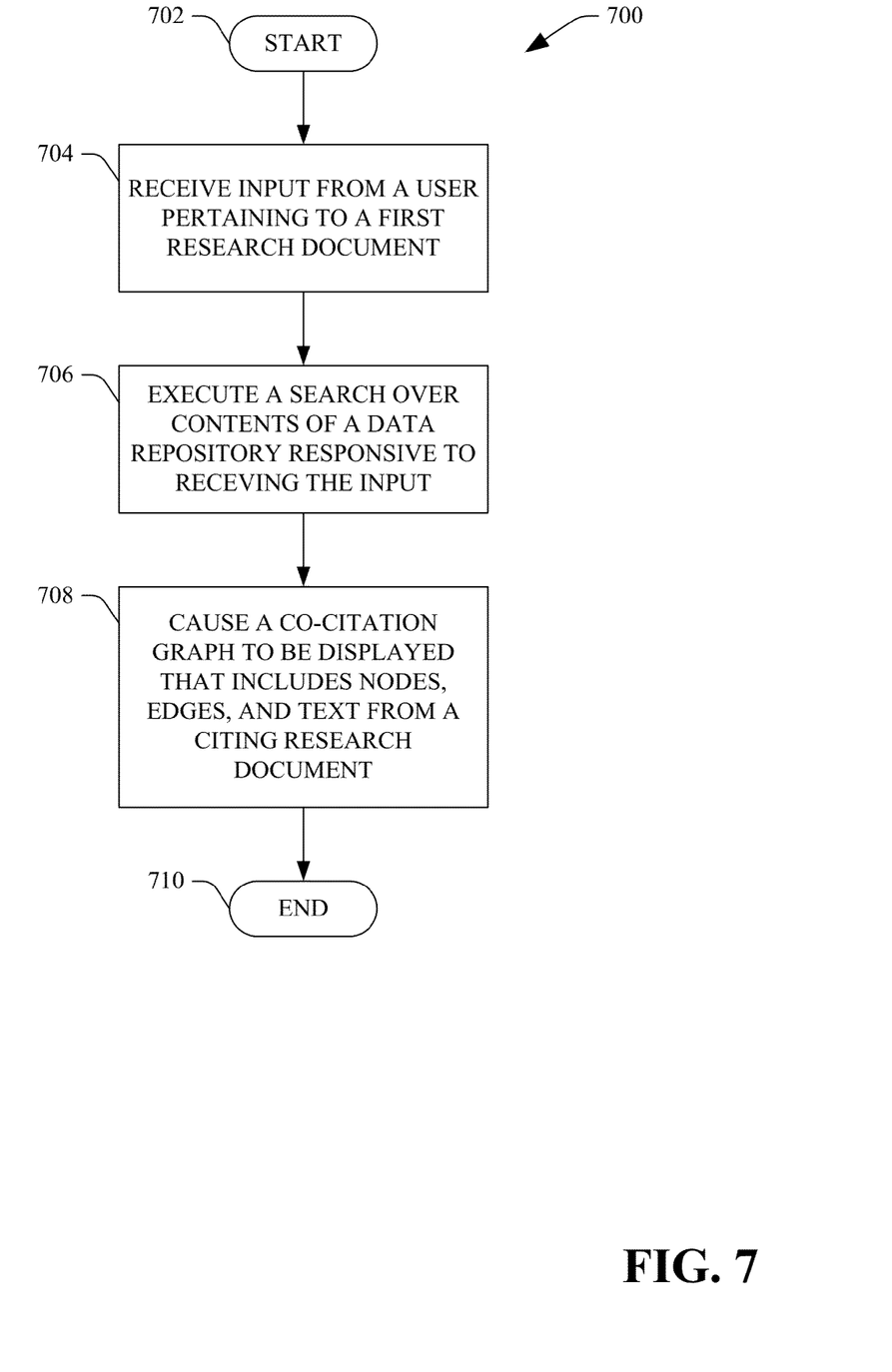
FIG. 7 is a flow diagram that illustrates a methodology for generating a context-informative co-citation graph.
Figure 8:
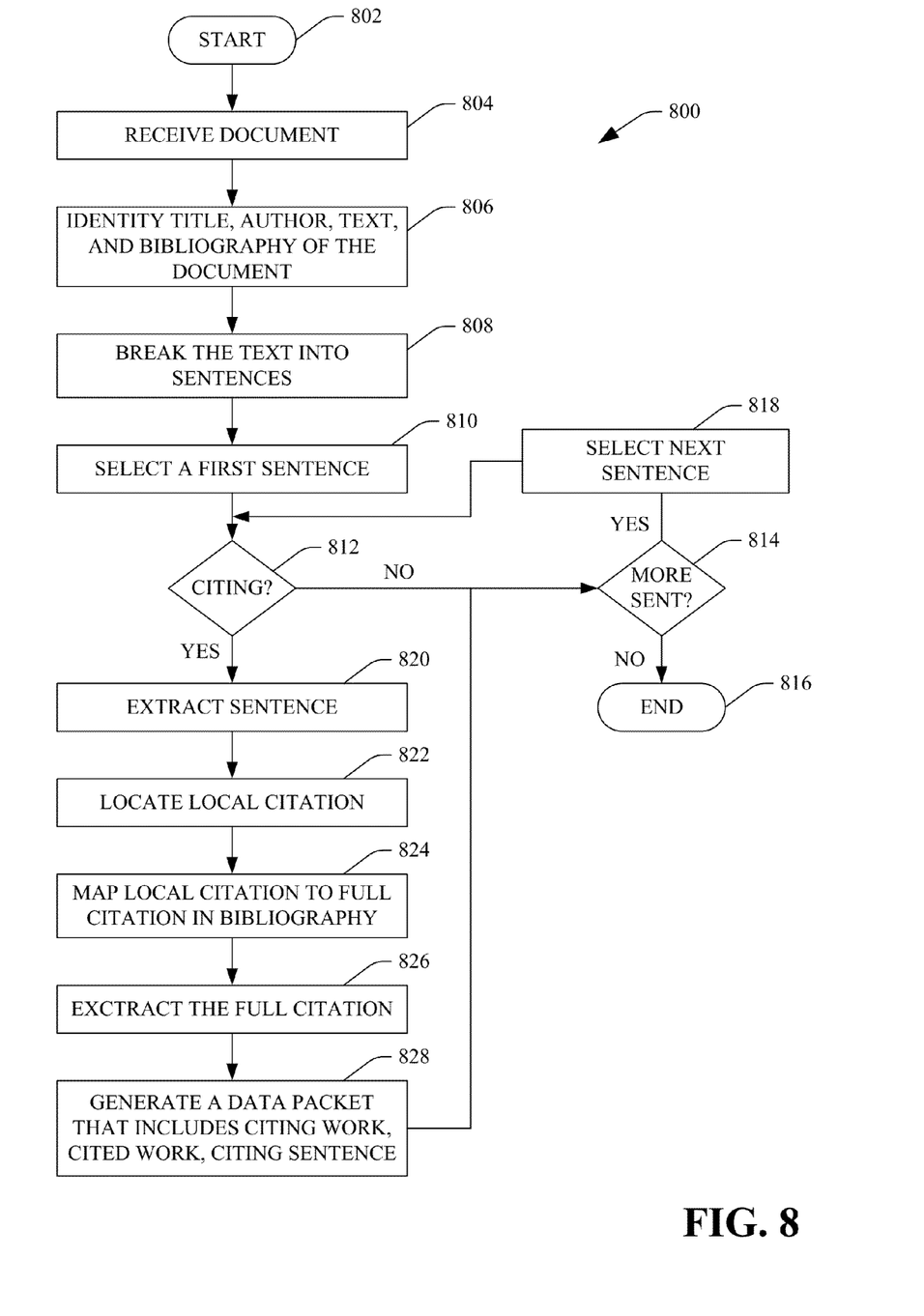
FIG. 8 is a flow diagram that illustrates an exemplary methodology for generating data packets that can be utilized in connection with generating a context-informative co-citation graph.

With reference now to FIGS. 7-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 7 an exemplary methodology 700 that facilitates generating a co-citation graph for display on a display screen of a computing device is illustrated. The methodology 700 starts at 702, and at 704 input from a user pertaining to a first research document is received. For example, the first research document can be or include at least one author and can comprise a bibliography that includes citations to other research documents. Further, the input from the user can be a query, a gesture, a spoken command, a selection of a node in a co-citation graph, or the like.

At 706, a search is executed over contents of a data repository responsive to receiving the input from the user. The data repository can include data pertaining to a plurality of research documents including the first research document. For instance, the data pertaining to the plurality of research documents may be a plurality tuples, wherein each tuple includes a cited work, a citing work, and at least a portion of the sentence that includes a citation to the cited work.

At 708, based at least in part upon the executing of the search, a co-citation graph is caused to be presented on a display screen of a computing device, wherein the co-citation graph comprises a first node that is representative of the first research document, a second node that is representative of a second research document, a third node is representative of a third research document, and text included in at least one sentence in the third research document that includes a citation to at least one of the first research document or the second research document. The third research document cites both the first research document and the second research document, and the text pertains to one or more sentences in the third research document that includes citations to the first research document or the second research document. The methodology 700 completes at 710.

Now referring to FIG. 8, an exemplary methodology 800 that facilitates generating a data packet for utilization in connection with generating a co-citation graph is illustrated. The methodology 800 starts at 802, and at 804 a research document is received. At 806, a computer executable program is utilized to identify a title, author, text portion and bibliography of the research document. At 808, sentences in the text portion are located such that the text portion is broken into a plurality of sentences.

At 810, a first sentence in the text portion is selected. At 812, a determination is made regarding whether the selected sentence includes a citation. If the selected sentence does not include a citation, then the methodology 800 proceeds to 814 where a determination is made regarding whether there are additional sentences in the text portion. If there are no more additional sentences, the methodology 800 completes at 816. If at 814 it is determined that there are additional sentences in the text portion, then at 818, the next sentence is selected and the methodology 800 proceeds to 812.

If at 812 it is determined that the selected sentence includes a citation to another research document, then at 820 the sentence is extracted or a summary of the sentence is generated. At 822, the local citation in the citing sentence is identified. For instance, the local citation may be a short citation, a link to a bibliography, etc. At 824, the local citation is mapped to the full citation in the identified bibliography. At 826, the full citation is extracted from the bibliography of the research document, and at 828 a data packet is generated that includes the identity of the citing work (title, author, etc.), the identity of the cited work (as extracted from the bibliography), and the extracted citing sentence or sentence summary. Subsequent to 828, the methodology 800 returns to 814, where a determination is made regarding whether additional sentences are included in the text portion of the research document.

It is to be understood that different research documents may identify or cite works in a different manner. Accordingly, a data cleaning process can be undertaken prior to finalizing data packets. For instance, once a plurality of data packets are generated, comparison between works can be undertaken to determine a measure of similarity between two citing works or cited works. If two cited works are substantially similar, than they can be combined or cleaned such that identities of research documents is consistent across data packets.

Figure 9:
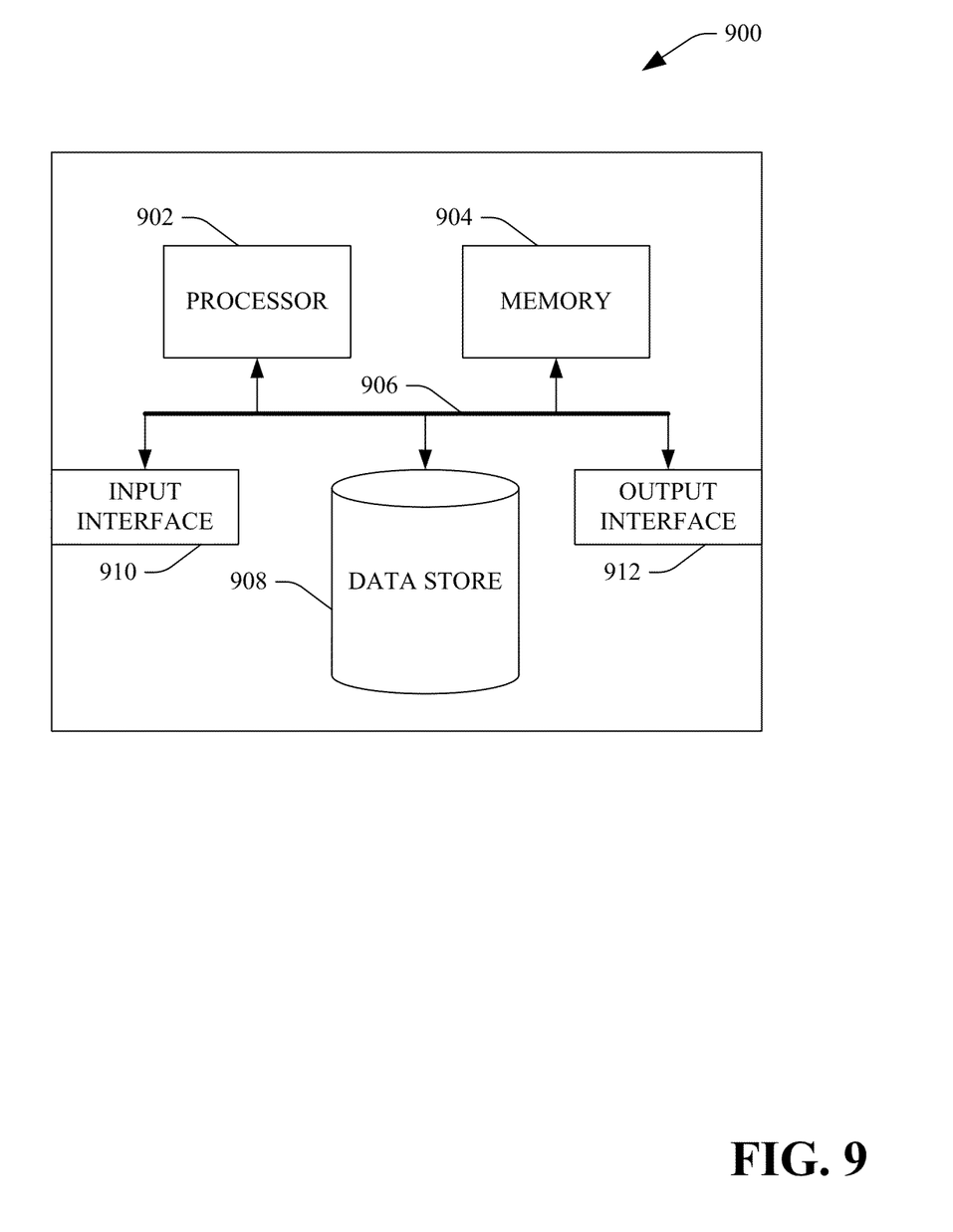
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports generating a context-informative co-citation graph. In another example, at least a portion of the computing device 900 may be used in a system that supports generating data packets that are utilized in connection with generating context-informative co-citation graphs. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store data packets, research documents, author information, etc.

The computing device 900 additionally includes a data store 908 that is accessible by the processor 902 by way of the system bus 906. The data store may be or include any suitable computer-readable storage, including a hard disk, memory, etc. The data store 908 may include executable instructions, co-citation graphs, data packets utilized in connection with generating co-citation graphs, research documents, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a computer processor, the method comprising:
   receiving a request for a co-citation graph for a first research document, wherein the first research document has an author and includes citations to other research documents;
   executing a search over contents of a data repository responsive to receiving the request, the data repository comprises a plurality of research documents including the first research document; and
   based at least in part upon executing the search, causing the co-citation graph to be presented on a display of a computing device, the co-citation graph presented on the display comprises:
      a first node that is representative of the first research document;
      a second node that is representative of a second research document;
      a plurality of nodes that are respectively representative of a plurality of other research documents, each research document in the plurality of other research documents comprising sentences that include citations to the first research document and the second research document; and
      graphical data that indicates that each research document in the plurality of other research documents comprises the sentences that include the citations to the first research document and the second research document.

2. The method of claim 1, wherein the graphical data comprises a first edge that couples the first node with a third node that represents a third research document, the first edge representing that the third research document comprises a first citation to the first research document, and a second edge that couples the second node with the third node to represent that the third research document comprises a second citation to the second research document.

3. The method of claim 2, further comprising:
   detecting that a cursor is being hovered over the third node in the co-citation graph; and
   responsive to the detecting that the cursor is being hovered over the third node in the co-citation graph, causing at least one of a first sentence or a second sentence to be displayed to the user, the first sentence comprises the first citation, the second sentence comprises the second citation.

4. The method of claim 1, wherein the graphical data comprises at least one sentence extracted from at least one research document from the plurality of other research documents.

5. The method of claim 1, further comprising:
   extracting a subject, predicate, object triple from a sentence in a third research document from the plurality of other research documents, the sentence comprises a citation to the first research document, wherein the graphical data comprises the subject, predicate, object triple.

6. The method of claim 1, wherein the first node is displayed in a first color, the second node is displayed in a second color, and a third node that is representative of a third research document in the plurality of other research documents is displayed in a third color.

7. The method of claim 1, wherein the request is a textual query.

8. The method of claim 1, wherein the request is a selection of the first node.

9. The method of claim 1, wherein the co-citation graph further comprises an edge that couples the first node and the second node, wherein length of the edge is indicative of a number times that the first research document and the second research document are co-cited by other research documents.

10. The method of claim 1, further comprising:
    detecting that a cursor is being hovered over the first node in the co-citation graph; and
    responsive to the detecting that the cursor is being hovered over the first node in the co-citation graph, causing information pertaining to the author of the first research document to be presented on the display.

11. The method of claim 10, wherein the information pertaining to the author comprises at least one of an identity of the author, a link to a web page that comprises biographical information of the author, or an image of the author.

12. A system comprising:
    a processor; and
    a memory that comprises components that are executable by the processor, the components comprising:
       a receiver component that is configured to receive a request for a co-citation graph for a first research document, the first research document has an author and includes citations to other research documents; and
       a co-citation graph generator component that is configured to:
       execute a search over contents of a data repository responsive to receiving the request, the data repository comprises a plurality of research documents including the first research document; and
       based upon the search, generate a co-citation graph for the first research document for presentment on a display, the co-citation graph comprises:
          a first node that is representative of the first research document;
          a second node that is representative of a second research document;
          a plurality of nodes that are respectively representative of a plurality of other research documents, each research document in the plurality of other research documents comprising sentences that include citations to the first research document and the second research document; and
          graphical data that indicates that each research document in the plurality of other research documents comprises the sentences that include the citations to the first research document and the second research document.

13. The system of claim 12, the plurality of nodes comprises a third node that that is representative of a third research document, the co-citation graph further comprises a first edge between the first node and the third node, and a second edge between the second node and the third node, wherein the first and second edges visually indicate that the third research document includes a first citation to the first research document and a second citation to the second research document.

14. The system of claim 13, wherein the co-citation graph further comprises a fourth node and a third edge, wherein the fourth node comprises text extracted from the third research document, the text corresponds to one of a first citation to the first research document or a second citation to the second research document, and wherein the third edge is between the fourth node and one of the first node or the second node to visually indicate that the third research document includes the first citation or the second citation.

15. The system of claim 12, wherein the request for the co-citation graph selection is a selection of the first node.

16. The system of claim 12, wherein the components further comprise a parser component that is configured to selectively extract information from each document in a document collection, wherein the information, for each document, comprises a title of a respective document, an author of the respective document, a citation to another document, and a sentence that includes the citation, wherein the co-citation graph generator component generates the co-citation graph based at least in part upon the information.

17. The system of claim 16, wherein the parser component, for sentences extracted from respective documents in the document collection, is configured to extract respective subject, predicate, object triples, and wherein the co-citation graph generated by the co-citation graph generator component comprises a subject, predicate, object triple extracted from the first sentence.

18. The system of claim 12, the co-citation graph further comprises an edge that couples the first node and the second node, wherein length of the edge is indicative of a number of times that the first research document and the second research document are co-cited by other research documents.

19. The system of claim 12, wherein the co-citation graph generator component is configured to present biographical information pertaining to an author of the first research document responsive to detection of a hover over the first node in the co-citation graph.

20. A computer-readable memory, the computer-readable memory comprising instructions that, when executed by a processor, cause the processor to perform acts comprising:
   receiving a query pertaining to a first research document from a user, wherein the first research document is co-cited with a second research document by a plurality of other research documents that are represented in a data repository;
   responsive to receiving the query, executing a search over the data repository, the data repository comprising first data that identifies research documents and second data that identifies respective citations in the research documents;
   based at least in part upon the search, causing a co-citation graph to be displayed on a display screen of a computing device, wherein the co-citation graph comprises:
      a first node that is representative of the first research document;
      a second node that is representative of the second research document;
      a plurality of other nodes that are respectively representative of the plurality of other research documents; and
      at least a portion of a sentence that includes a citation from a research document in the plurality of other research documents to the first research document.

* * * * *